US012482938B2

(12) United States Patent
Wang et al.

(10) Patent No.: US 12,482,938 B2
(45) Date of Patent: Nov. 25, 2025

(54) ANTENNA STRUCTURE AND TERMINAL DEVICE

(71) Applicant: Beijing Xiaomi Mobile Software Co., Ltd., Beijing (CN)

(72) Inventors: Wei Wang, Beijing (CN); Ching-Sung Wang, Beijing (CN); Yueliang Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 167 days.

(21) Appl. No.: 18/456,324

(22) Filed: Aug. 25, 2023

(65) Prior Publication Data

US 2024/0283153 A1 Aug. 22, 2024

(30) Foreign Application Priority Data

Feb. 22, 2023 (CN) ......................... 202310188948.3

(51) Int. Cl.

*H01Q 1/24* (2006.01)
*H01Q 5/335* (2015.01)
*H01Q 5/357* (2015.01)
*H01Q 5/50* (2015.01)

(52) U.S. Cl.

CPC ............. *H01Q 5/357* (2015.01); *H01Q 1/241* (2013.01); *H01Q 5/50* (2015.01)

(58) Field of Classification Search

CPC .......... H01Q 1/24; H01Q 1/241; H01Q 1/243; H01Q 5/30; H01Q 5/328; H01Q 5/335; H01Q 5/357; H01Q 5/371; H01Q 5/50; H01Q 9/40; H01Q 9/42

See application file for complete search history.

(56) References Cited

U.S. PATENT DOCUMENTS

2013/0135150 A1* 5/2013 Kenoun ............... H01Q 9/0421
343/700 MS
2018/0212313 A1* 7/2018 Harper ..................... H01Q 1/50
2021/0273340 A1* 9/2021 Sun .......................... H01Q 5/10
2022/0407218 A1* 12/2022 Guo ....................... H01Q 5/328

FOREIGN PATENT DOCUMENTS

CN 212033 246 U 11/2020

OTHER PUBLICATIONS

Extended European Search Report mailed Mar. 18, 2024 in corresponding European Patent Application No. 23203996.6, 9 pages.

* cited by examiner

*Primary Examiner* — Thai Pham

(74) *Attorney, Agent, or Firm* — Oblon, McClelland, Maier & Neustadt, L.L.P.

(57) ABSTRACT

An antenna structure and a terminal device are provided. The antenna structure is applied to a terminal device with a curved screen. The antenna structure includes a radiator and a feeding point. The radiator has a first break and a second break located on different sides, the first break is on one curved side edge, and the second break is on one non-curved side edge. The feeding point is electrically connected to the radiator and located between the first break and the second break. A length of a radiation arm between the feeding point and the first break is less than a length of a radiation arm between the feeding point and the second break. The antenna structure has a low-frequency radiation mode that utilizes the radiation arm between the feeding point and the second break for radiation.

19 Claims, 6 Drawing Sheets

ANTENNA STRUCTURE AND TERMINAL DEVICE

CROSS REFERENCE TO RELATED APPLICATION

This application is based upon and claims priority to Chinese Patent Application No. 202310188948.3, filed on Feb. 22, 2023, the entire content thereof is incorporated herein by reference.

BACKGROUND

Technical Field

The present disclosure relates to the field of antenna technology, in particular to an antenna structure and a terminal device.

Description of the Related Art

Low frequency (650-1000 MHz) is an essential frequency band for 2G/3G/4G/5G, and is very important in a mobile communication system. A low-frequency antenna, due to its natural advantages of wide coverage and low propagation loss, is commonly used in outdoor, suburban and other scenarios that require wide signal coverage. Meanwhile, business carried by a network signal of a low-frequency antenna is often voice call service, and the quality of the low-frequency antenna is crucial for user experience.

As is well known, an appearance shape of a mobile phone has a significant impact on the performance of the antenna, especially a border of a screen which has a significant impact on antenna clearance. In the current era of increasing demand for the full-screen, it is very crucial to optimize antenna performance under extreme antenna clearance.

SUMMARY

The present disclosure provides an antenna structure and a terminal device.

According to a first aspect of embodiments of the present disclosure, an antenna structure is provided. The antenna structure is applied to a terminal device with a curved screen. The antenna structure includes a radiator having a first break and a second break located on different sides, wherein the first break is on one of the curved side edges, and the second break is on one of the non-curved side edges; and a feeding point electrically connected to the radiator, wherein the feeding point is located between the first break and the second break, and a length of a radiation arm between the feeding point and the first break is less than a length of a radiation arm between the feeding point and the second break. The antenna structure has a low-frequency radiation mode that utilizes the radiation arm between the feeding point and the second break for radiation.

In some embodiments, the antenna structure further includes a first tuning point electrically connected to the radiator and arranged close to the second break.

In some embodiments, the antenna structure further includes a tuning circuit and a switching circuit, wherein the first tuning point is electrically connected to the tuning circuit, and the tuning circuit is electrically connected to the switching circuit, and wherein in response to different switching states of the switching circuit, the tuning circuit has different impedances to enable the radiator to cover different frequency ranges.

In some embodiments, the antenna structure further includes a second tuning point electrically connected to the radiator and located between the feeding point and the first tuning point.

In some embodiments, the second tuning point is electrically connected to a discrete device, wherein the discrete device includes an inductor, a capacitor, or a resistor.

In some embodiments, a sum of the length of the radiation arm between the feeding point and the first break and a length of a radiation arm between the feeding point and the second tuning point is greater than a length of a radiation arm between the second tuning point and the second break.

In some embodiments, the length of the radiation arm between the feeding point and the first break is equal to the length of the radiation arm between the second tuning point and the second break.

In some embodiments, the low-frequency radiation mode includes a low-frequency quarter wavelength mode.

In some embodiments, a frequency range of an operating frequency band covered by the radiator is 650-1000 MHz.

In some embodiments, the antenna structure further includes a feeding source and a matching circuit, wherein the feeding point is electrically connected to the feeding source through the matching circuit.

According to a second aspect of embodiments of the present disclosure, a terminal device is provided, including a curved screen and an antenna structure as described in any of above embodiments, and the antenna structure is located at an R angle of the terminal device.

In some embodiments, the terminal device includes a metal housing wrapped outside the curved screen, and the radiator of the antenna structure is at least part of the metal housing.

In some embodiments, the terminal device further includes a plastic casing, and the plastic casing is wrapped outside the metal housing.

In some embodiments, the curved screen has two long edges and two short edges, the two long edges are bending and located respectively on the two side edges of the terminal device, and the two short edges are located respectively at a bottom and a top of the terminal device, and wherein the radiation arm between the feeding point and the first break is located on one of the side edges of the terminal device, and at least part of the radiation arm between the feeding point and the second break is located at the bottom or the top of the terminal device.

It should be understood that the general description above and the detailed description in the following text are only illustrative and explanatory, and do not limit the present disclosure.

BRIEF DESCRIPTION OF THE DRAWINGS

In order to more clearly illustrate technical solutions in embodiments of the present disclosure, a brief introduction will be given to the drawings required for the description of embodiments. It is apparent that the drawings in the following description are only some embodiments of the present disclosure, and for those of ordinary skill in the art, other drawings can be obtained based on these drawings without any creative effort.

DETAILED DESCRIPTION OF THE PREFERRED EMBODIMENTS

Figure 1:
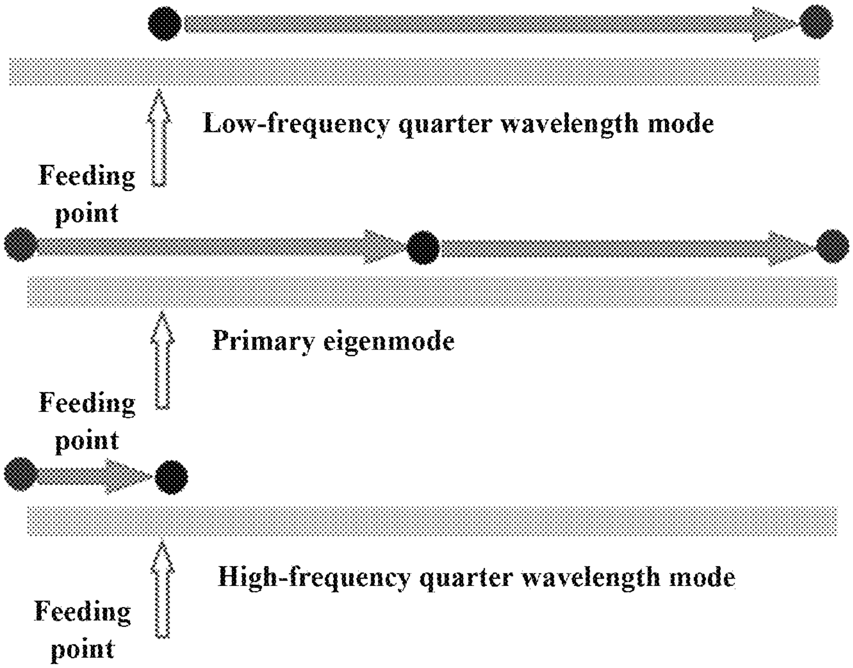
FIG. 1 is a schematic diagram of three radiation modes of a low-frequency T-antenna.

A detailed explanation of exemplary embodiments, which are illustrated in the drawings, will be given herein. When the following description refers to the drawings, the same numerals in different drawings represent the same or similar elements unless otherwise indicated. Embodiments described in the following exemplary embodiments do not represent all embodiments consistent with the present disclosure. Instead, they are only examples of devices and methods that are consistent with some aspects of the present disclosure.

Terms used in the present disclosure are only for the purpose of describing specific embodiments and are not intended to limit the present disclosure. Unless otherwise defined, technical or scientific terms used in the present disclosure shall have the ordinary meaning as understood by those skilled in the art to which the present disclosure pertains. Terms "first", "second", and the like, as used in the present disclosure do not indicate any order, quantity, or importance, but are only used to distinguish different components. Similarly, words such as "a" or "an" does not indicate a quantity limit, but rather indicate the presence of at least one. If it only refers to "one", a separate explanation will be provided. "Multiple" or "several" indicates two or more. Unless otherwise indicated, words such as "front", "back", "lower part" and/or "upper part", "top", "bottom", etc., are only for convenience of explanation and are not limited to one position or spatial orientation. Similar terms such as "include" or "comprise" refer to components or objects that appear before "include" or "comprise", cover those components or objects listed after "include" or "comprise" and their equivalents, and do not exclude other components or objects. Words such as "connection" or "connected", and the like are not limited to physical or mechanical connections, and can include electrical connections, whether direct or indirect.

A low-frequency antenna is often in the form of a T-type antenna (referred to as T-antenna). As shown in FIG. 1, the T-antenna often uses three modes in a low frequency band, the first mode is a low-frequency quarter wavelength mode, the second mode is a primary eigenmode, and the third mode is high-frequency quarter wavelength mode. In terms of an antenna length, the antenna length in low-frequency quarter wavelength mode is greater than that in primary eigenmode, and the antenna length in primary eigenmode is greater than that is high-frequency quarter wavelength mode. In terms of a resonant frequency, the resonant frequency in low-frequency quarter wavelength mode is lower than that in primary eigenmode, and the resonant frequency in primary eigenmode is lower than that in high-frequency quarter wavelength mode.

The primary eigenmode is the eigenmode of the T-antenna. The resonant frequency of the eigenmode is related to an antenna length, and is independent of a position of a feeding point. The resonant frequencies in low-frequency quarter wavelength mode and in high-frequency quarter wavelength mode are related to the position of a feeding point. When the position of the feeding point shifts left or right, the resonant frequency also changes accordingly. When the feeding point is to the left of a center point of the antenna, the low-frequency quarter wavelength mode is to the right of the center point, and when the feeding point is to the right of the center point of the antenna, the low-frequency quarter wavelength mode is to the left of the center point.

Generally speaking, the frequency of the low-frequency quarter wavelength mode is lower, which is closer to an operating frequency of a low-frequency antenna (650-1000 MHz). Therefore, the low-frequency T-antenna mainly uses the low-frequency quarter wavelength mode for radiation. In some scenarios, for example, when the feeding point is close to the center point of the antenna, the primary eigenmode, the high-frequency quarter wavelength mode and the low-frequency quarter wavelength mode are relatively close to each other. Therefore, in fact, in addition to the low-frequency quarter wavelength mode, an antenna radiation mode is also mixed with the primary eigenmode and the high-frequency quarter wavelength mode.

Figure 2:
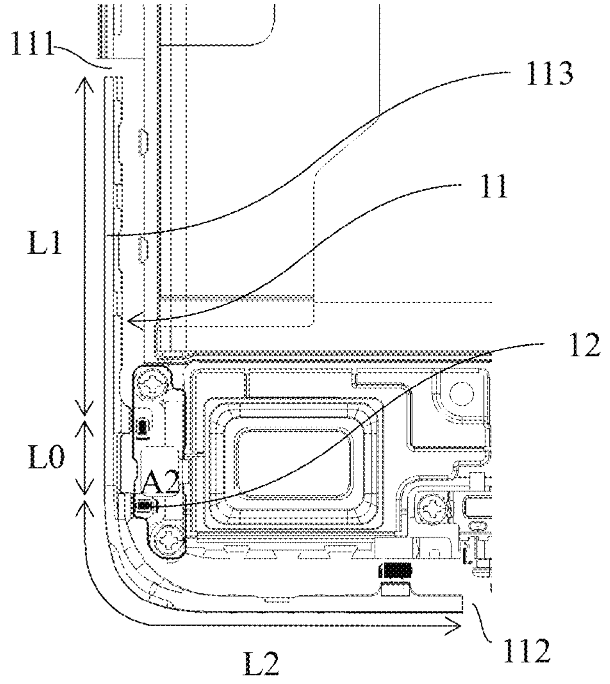
FIG. 2 is a schematic diagram of an antenna structure applied to a straight screen terminal device.

FIG. 2 illustrates a schematic diagram of an antenna structure applied to a straight screen terminal device. As shown in FIG. 2, the antenna structure is located at an R angle of the straight screen terminal device, for example, at a bottom left corner shown in FIG. 2. A radiator 11 of the antenna structure has a first break 111 and a second break 112. The first break 111 is located on a left side of the straight screen terminal device, and the second break 112 is located at a bottom of the straight screen terminal device. A length of the radiator 11 of the antenna structure is L1+L0+L2.

A position point A2 between the length L0 and the length L2 is selected as a feeding point 12 for the antenna structure, where L1+L0>L2.

Figure 3:
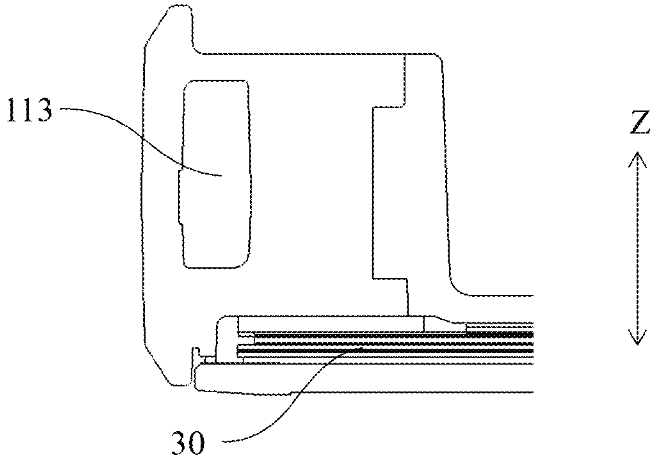
FIG. 3 is a cross-sectional view of side antenna environment of the antenna structure shown in FIG. 2.

FIG. 3 illustrates a cross-sectional view of side antenna environment of the antenna structure shown in FIG. 2. As shown in FIG. 3, in the terminal device with a straight screen 30, a Z-direction height of the radiator 113 at a side edge of the antenna structure is relatively large, and the antenna environment at the side edge of the terminal device (such as a left side shown in FIG. 3) is generally at a good level. Therefore, the location point A2 is selected as the feeding point 12 of the antenna structure, where L1+L0>L2. Since the low-frequency quarter wavelength mode is mainly located on a radiation arm between the location point A2 and the first break 111, the side antenna environment is good, and the low frequency can reach a relatively good level in such a situation.

In some extremely narrow frame projects, for example, a curved screen, a hyperbolic screen, and a hyperbolic plastic middle frame, and other projects, the side antenna environment is severely compressed due to a border of the screen, resulting in poor antenna clearance. In addition, the curved screen can also cause a significant reduction in a width of the antenna radiator. Therefore, in above scheme using the side antenna environment, a performance deterioration will be resulted in this case.

Embodiments of the present disclosure provides an antenna structure and a terminal device having the same. The antenna structure can be applied to the terminal device with a curved screen, and the curved screen has two curved side edges and two non-curved side edges. The antenna structure includes a radiator and a feeding point electrically connected to the radiator. The radiator has a first break and a second break located on different sides. The first break is located on one of the curved side edges, and the second break is located on one of the non-curved side edges. The feeding point is located between the first break and the second break, and a length of a radiation arm between the feeding point and the first break is less than a length of a radiation arm between the feeding point and the second break. The antenna structure has a low-frequency radiation mode that utilizes the radiation arm between the feeding point and the second break for radiation.

The present disclosure is aimed at the curved screen. The position of the feeding point of the antenna structure is changed, and a main radiation mode of the antenna structure is adjusted to the non-curved side edge, so as to adjust the main radiation mode of the antenna structure to a relatively good antenna environment of the terminal device, thereby achieving the goal of improving the antenna performance under extreme antenna clearance of the curved side edge.

A detailed explanation of the antenna structure and terminal device disclosed in embodiments of the present disclosure will be provided in the following, in conjunction with the drawings. Of course, the features in the following embodiments and implementations can be combined with each other.

Figure 4:
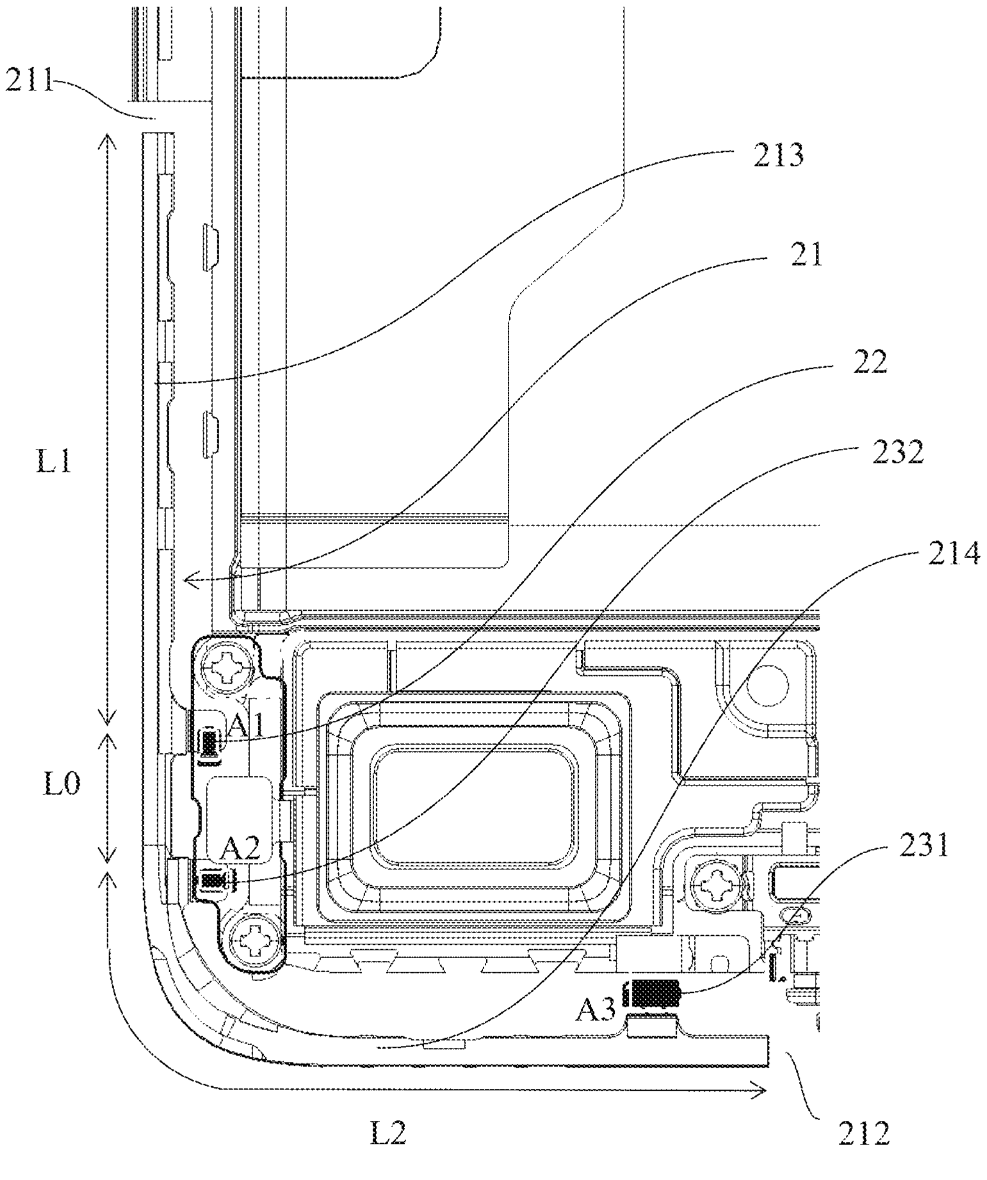
FIG. 4 is a schematic diagram of an antenna structure applied to a terminal device with a curved screen according to embodiments of the present disclosure.

FIG. 4 illustrates a schematic diagram of an antenna structure applied to a terminal device with a curved screen according to embodiments of the present disclosure. As shown in FIG. 4, embodiments of the present disclosure provide an antenna structure. The antenna structure is applied to a terminal device with a curved screen, and the curved screen has two curved side edges and two non-curved side edges. In some embodiments, the antenna structure is a T-type antenna. The antenna structure includes a radiator 21 and a feeding point 22 electrically connected to the radiator 21. The radiator 21 has a first break 211 and a second break 212 located on different sides. The first break 211 is located on one of the curved side edges, and the second break 212 is located on one of the non-curved side edges. In embodiments shown in FIG. 4, the first break 211 is located on a left side of the terminal device, and the second break 212 is located at the bottom of the terminal device. However, the positions of the first break 211 and the second break 212 provided by embodiments of the present disclosure are not limited to those shown in FIG. 4. In other embodiments, the first break 211 can also be located on a right side of the terminal device, and the second break 212 can also be located on the top of the terminal device, which is not limited in the present disclosure.

The feeding point 22 is located between the first break 211 and the second break 212, and a length of a radiation arm between the feeding point 22 and the first break 211 is less than a length of a radiation arm between the feeding point 22 and the second break 212. In some embodiments, a length of the radiator 21 of the antenna structure is L1+L0+L2. A position point A1 between a length L1 and a length L0 is selected as the feeding point 22 of the antenna structure, where L1<L0+L2.

In some embodiments, the antenna structure provided by embodiments of the present disclosure has a first radiation mode that utilizes the radiation arm between the feeding point 22 and the second break 212 for radiation, and a second radiation mode that utilizes the radiation arm between the feeding point 22 and the first break 211 for radiation. A frequency of the first radiation mode is lower than a frequency of the second radiation mode. The first radiation mode is a low-frequency radiation mode, and the second radiation mode is a high-frequency radiation mode.

In some embodiments, a frequency range of an operating frequency band covered by the radiator 21 is 650-1000 MHz.

In some embodiments, the first radiation mode includes a low-frequency quarter wavelength mode, and the second radiation mode includes a high-frequency quarter wavelength mode.

Figure 5:
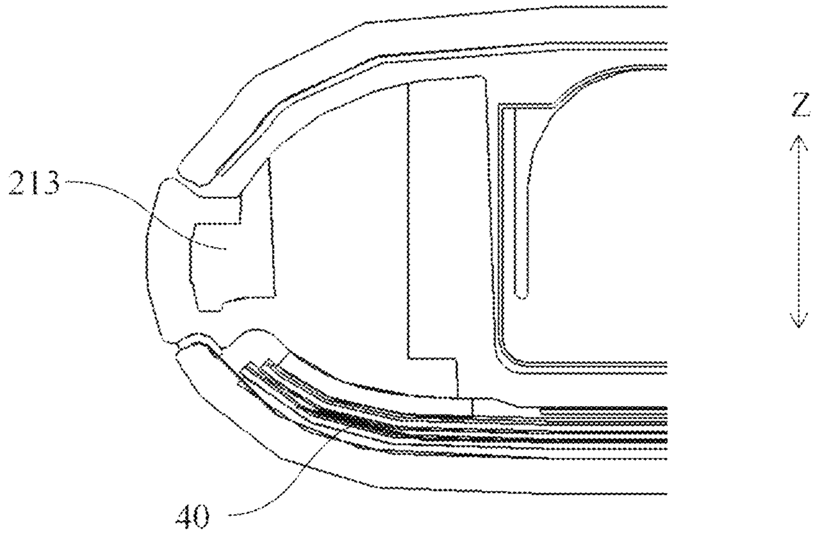
FIGS. 5 and 6 are respectively cross-sectional views of side antenna environment and bottom antenna environment of the antenna structure shown in FIG. 4.
Figure 6:
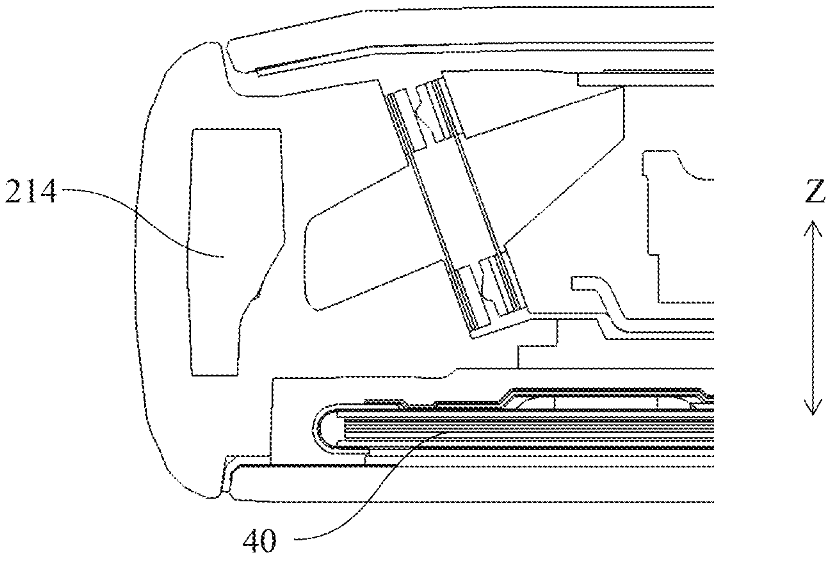

FIGS. 5 and 6 respectively illustrate cross-sectional views of side antenna environment and bottom antenna environment of the antenna structure shown in FIG. 4. As shown in FIGS. 5 and 6, it can be clearly seen that in the antenna structure of the terminal device with a curved screen 40, a Z-direction height of a bottom antenna radiator 214 is significantly higher than a Z-direction height of a side antenna radiator 213. In addition, the antenna clearance at the bottom is also better than the side edge.

According to embodiments of the present disclosure, by changing the position of the feeding point 22, the feeding point 22 of the antenna structure is changed from an original position point A2 that is between the length L0 and the length L2 to a position point A1 that is between the length L1 and the length L0, where L1<L0+L2. As a result, the low-frequency quarter wavelength mode of the antenna structure is adjusted from the side edge to the bottom. In this way, the antenna mainly utilizes the radiation environment from the bottom to achieve good effects.

Figure 7:
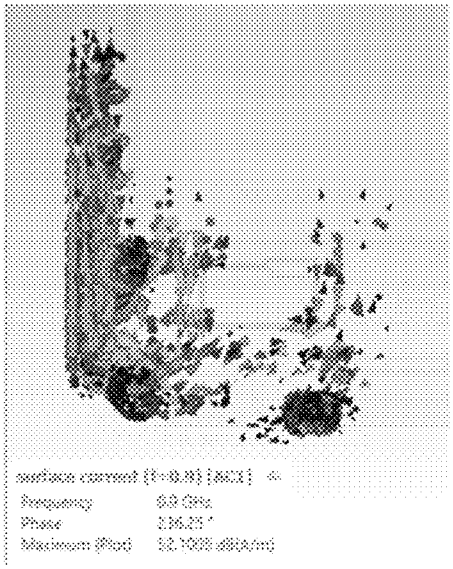
FIG. 7 is a schematic diagram of a current distribution when the low-frequency antenna selects a position point A2 between a length L0 and a length L2 shown in FIG. 4 as a feeding point.

FIG. 7 illustrates a schematic diagram of a current distribution when the low-frequency antenna selects a position point A2 between the length L0 and the length L2 as the feeding point. As shown in FIG. 7, it can be seen that the main current distribution of the low-frequency antenna at 0.9 GHz is at a side edge position.

Figure 8:
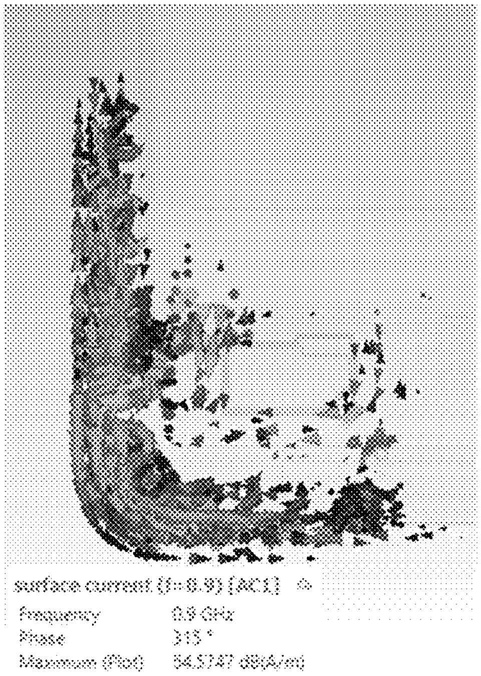
FIG. 8 is a schematic diagram of a current distribution when the low-frequency antenna selects a position point A1 between a length L1 and a length L0 shown in FIG. 4 as a feeding point.

FIG. 8 illustrates a schematic diagram of a current distribution when the low-frequency antenna selects a position point A1 between the length L1 and the length L0 as the feeding point. As shown in FIG. 8, it can be seen that, compared to the main current distribution of the low-frequency antenna at 0.9 GHz when a position point A2 is selected as the feeding point, a significant portion of the current has been transferred to the bottom.

Figure 9:
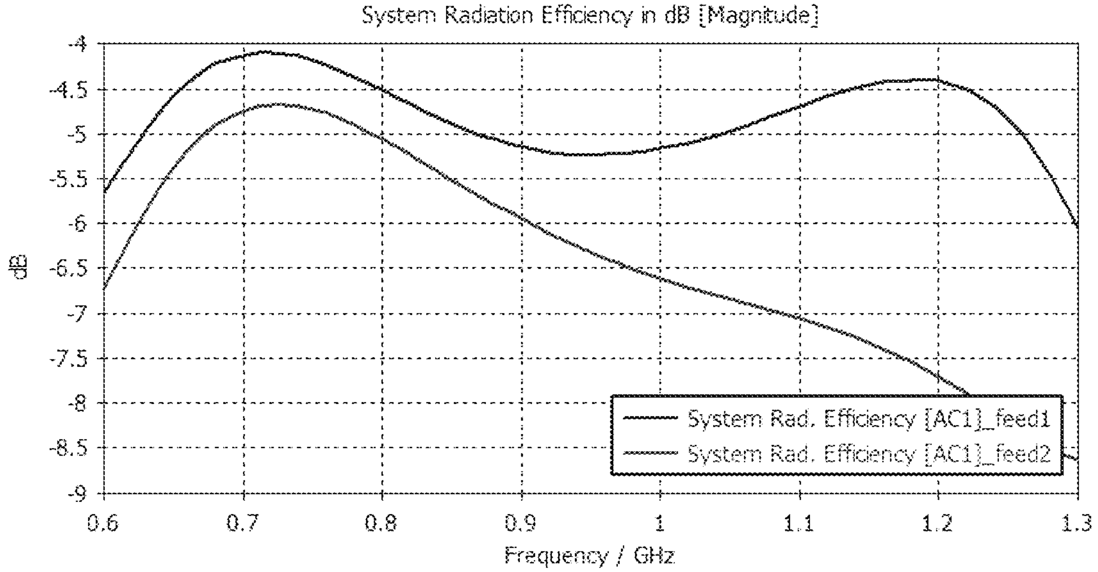
FIG. 9 shows antenna radiation efficiency when the low-frequency antenna selects a position point A1 and a position point A2 as feeding points, and is fed at the position point A1 and the position point A2, respectively.

FIG. 9 illustrates antenna radiation efficiency when the low-frequency antenna is fed at the position A1 and the position A2, respectively. As shown in FIG. 9, it can be seen that at 0.9 GHZ, the radiation efficiency achieved by feeding at the feeding position A1 is about 0.8 dB higher than the radiation efficiency achieved by feeding at the feeding position A2, with other low-frequency frequency bands also being improved.

According to embodiments of the present disclosure, the main radiation mode of the antenna structure can be adjusted from a poor antenna environment to an overall better antenna environment by adjusting the position of the feeding point 22 of the antenna structure, thereby optimizing the antenna performance from the antenna environment. In certain extreme antenna environments, significant effects can be achieved.

Figure 10:
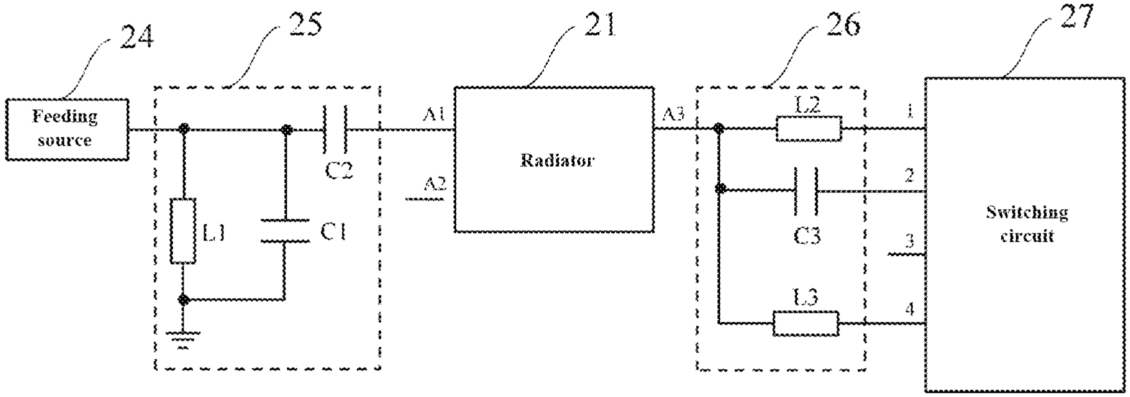
FIG. 10 is a schematic diagram of a matching network for an antenna structure according to embodiments of the present disclosure.

FIG. 10 illustrates a schematic diagram of a matching network for an antenna structure according to embodiments of the present disclosure. As shown in FIG. 10 and in conjunction with reference to FIG. 4, the antenna structure provided by embodiments of the present disclosure includes a feeding source 24. The feeding point 22 is electrically connected to the feeding source 24, and the feeding source 24 is used for transmitting radio frequency signals. In some embodiments, the antenna structure provided by embodiments of the present disclosure further includes a matching circuit 25. The feeding point 22 is electrically connected to the feeding source 24 through the matching circuit 25. The matching circuit 25 can include a capacitor and/or an inductor connected in parallel or series. The matching circuit 25 can be used to tune impedance of a feeding path from the feeding source 24 to the radiator 21, thereby improving the conversion efficiency of the signal.

In some embodiments, the antenna structure provided by embodiments of the present disclosure further includes a first tuning point 231. The first tuning point 231 is electrically connected to the radiator 21, and the first tuning point 231 is arranged close to the second break 212.

The antenna structure provided by embodiments of the present disclosure further includes a tuning circuit 26 and a switching circuit 27. The first tuning point 231, the tuning circuit 26, and the switching circuit 27 can be arranged on a circuit board in a housing of the terminal device. The first tuning point 231 is electrically connected to the tuning circuit 26, and the tuning circuit 26 is electrically connected to the switching circuit 27. When the switching circuit 27 is in different switching states, the tuning circuit 26 has different impedances to enable the radiator 21 to cover different frequency ranges. The tuning circuit 26 can include an inductor, a capacitor, a resistor, or a combination thereof. By adding tuning circuit 26 and switching circuit 27 to the antenna structure, the frequency range of a transceiver band of the antenna structure can be extended, so that the antenna structure can support more frequency ranges, thereby meeting the needs of different communication scenarios.

In some embodiments, the antenna structure provided by embodiments of the present disclosure can further include a second tuning point 232. The second tuning point 232 is electrically connected to the radiator 21, and is located between the feeding point 22 and the first tuning point 231. The second tuning point 232 is located, for example, at a position point A3 of the radiator 21 shown in FIG. 4. The second tuning point 232 is electrically connected to a discrete device, and the discrete device can include an inductor, a capacitor, or a resistor.

In some embodiments, the feeding point 22 and the second tuning point 232 in the present disclosure can be arranged on a circuit board, and the first tuning point 231 in the present disclosure can be arranged on another circuit board.

In some embodiments, a sum of a length L1 of a radiation arm between the feeding point 22 and the first break 211 and a length L0 of a radiation arm between the feeding point 22 and the second tuning point 232 is greater than a length L2 of a radiation arm between the second tuning point 232 and the second break 212, i.e., $L1+L0>L2$.

In some embodiments, a length L1 of a radiation arm between the feeding point 22 and the first break 211 is equal to a length L2 of a radiation arm between the second tuning point 232 and the second break 212, i.e., $L1=L2$.

The antenna structure provided by embodiments of the present disclosure can improve the performance of the antenna in the extreme antenna environment by adjusting at least part of the radiation arm used for the main radiation mode to a position where the antenna environment is better.

Embodiments of the present disclosure also provide a terminal device. The terminal device includes a curved screen and an antenna structure as described in above embodiments, and the antenna structure is located at an R angle of the terminal device.

In some embodiments, the terminal device includes a metal housing wrapped outside the curved screen, and the radiator 21 of the antenna structure is at least part of the metal housing.

In some embodiments, the terminal device can also include a plastic casing, and the plastic casing is wrapped outside the metal housing.

In some embodiments, the curved screen has two long edges and two short edges. The two long edges are bending and located respectively on the two side edges of the terminal device, and two short edges are located respectively at the bottom and the top of the terminal device. A radiation arm between the feeding point 22 and the first break 211 is located on one of the side edges of terminal device, and at least part of a radiation arm between the feeding point 22 and the second break 212 is located at the bottom or the top of the terminal device. For example, in embodiments shown in FIG. 4, the radiation arm between the feeding point 22 and the first break 211 is located on a left side edge of the terminal device, and at least part of the radiation arm between the feeding point 22 and the second break 212 is located at the bottom of the terminal device. In some other embodiments, the radiation arm between the feeding point 22 and the first break 211 can also be located on a right side of the terminal device, and at least part of the radiation arm between the feeding point 22 and the second break 212 can also be located on the top of the terminal device. The position of the radiator 21 in the terminal device can be suitably arranged according to actual internal space of the terminal device.

It should be noted that the description of the antenna structure in above embodiments and implementations is also applicable to the terminal device provided by embodiments of the present disclosure. The terminal device in embodiments can be mobile phones, tablet personal computers, laptop computers, personal digital assistants (PDAs), mobile internet devices (MIDs), or wearable devices, etc. The terminal device provided by embodiments of the present disclosure adopts the antenna structure mentioned above, and can achieve good communication effects.

After considering the specification and practices of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that above embodiments are only optional embodiments of the present disclosure, which are not intended to limit the present disclosure. Any modifications, equivalent replacements, improvements, etc. made within the spirit and principles of the present disclosure shall be included in the protection scope of the present disclosure.

The invention claimed is:

1. An antenna structure, wherein the antenna structure is disposed in a terminal device, the terminal device has a curved screen, and the curved screen comprises two curved side edges and two non-curved side edges, and wherein the antenna structure comprises:

a radiator having a first break and a second break located on different sides, wherein the first break is on one of the curved side edges, and the second break is on one of the non-curved side edges;

a feeding point electrically connected to the radiator, wherein the feeding point is located between the first break and the second break, and a length of a radiation arm between the feeding point and the first break is less than a length of a radiation arm between the feeding point and the second break;

a first tuning point electrically connected to the radiator and arranged close to the second break; and a tuning circuit and a switching circuit, wherein the first tuning point is electrically connected to the tuning circuit, and the tuning circuit is electrically connected to the switching circuit;

wherein the antenna structure has a low-frequency radiation mode that utilizes the radiation arm between the feeding point and the second break for radiation, and in response to different switching states of the switching circuit, the tuning circuit has different impedances to enable the radiator to cover different frequency ranges.

2. The antenna structure according to claim 1, further comprising:

a second tuning point electrically connected to the radiator and located between the feeding point and the first tuning point.

3. The antenna structure according to claim 2, wherein the second tuning point is electrically connected to a discrete device, wherein the discrete device comprises an inductor, a capacitor, or a resistor.

4. The antenna structure according to claim 2, wherein a sum of the length of the radiation arm between the feeding point and the first break and a length of a radiation arm between the feeding point and the second tuning point is greater than a length of a radiation arm between the second tuning point and the second break.

5. The antenna structure according to claim 4, wherein the length of the radiation arm between the feeding point and the first break is equal to the length of the radiation arm between the second tuning point and the second break.

6. The antenna structure according to claim 1, wherein the low-frequency radiation mode comprises a low-frequency quarter wavelength mode.

7. The antenna structure according to claim 1, wherein a frequency range of an operating frequency band covered by the radiator is 650-1000 MHz.

8. The antenna structure according to claim 1, further comprising:

a feeding source and a matching circuit, wherein the feeding point is electrically connected to the feeding source through the matching circuit.

9. A terminal device, comprising:

a curved screen having two curved side edges and two non-curved side edges; and an antenna structure located at a corner of the terminal device, wherein the antenna structure comprises:

a radiator having a first break and a second break located on different sides, wherein the first break is on one of the curved side edges, and the second break is on one of the non-curved side edges;

a feeding point electrically connected to the radiator, wherein the feeding point is located between the first break and the second break, and a length of a radiation arm between the feeding point and the first break is less than a length of a radiation arm between the feeding point and the second break;

a first tuning point electrically connected to the radiator and arranged close to the second break; and a tuning circuit and a switching circuit, wherein the first tuning point is electrically connected to the tuning circuit, and the tuning circuit is electrically connected to the switching circuit;

wherein the antenna structure has a low-frequency radiation mode that utilizes the radiation arm between the feeding point and the second break for radiation, and in response to different switching states of the switching circuit, the tuning circuit has different impedances to enable the radiator to cover different frequency ranges.

10. The terminal device according to claim 9, wherein the antenna structure further comprises:

a second tuning point electrically connected to the radiator and located between the feeding point and the first tuning point.

11. The terminal device according to claim 10, wherein the second tuning point is electrically connected to a discrete device, wherein the discrete device comprises an inductor, a capacitor, or a resistor.

12. The terminal device according to claim 10, wherein a sum of the length of the radiation arm between the feeding point and the first break and a length of a radiation arm between the feeding point and the second tuning point is greater than a length of a radiation arm between the second tuning point and the second break.

13. The terminal device according to claim 12, wherein the length of the radiation arm between the feeding point and the first break is equal to the length of the radiation arm between the second tuning point and the second break.

14. The terminal device according to claim 9, further comprising:

a metal housing wrapped outside the curved screen, wherein the radiator of the antenna structure is at least part of the metal housing.

15. The terminal device according to claim 14, further comprising:

a plastic casing wrapped outside the metal housing.

16. The terminal device according to claim 9, wherein the curved screen has two long edges and two short edges, the two long edges are bending and located respectively on the two side edges of the terminal device, and the two short edges are located respectively at a bottom and a top of the terminal device, and wherein the radiation arm between the feeding point and the first break is located on one of the side edges of the terminal device, and at least part of the radiation arm between the feeding point and the second break is located at the bottom or the top of the terminal device.

17. The terminal device according to claim 9, wherein the low-frequency radiation mode comprises a low-frequency quarter wavelength mode.

18. The terminal device according to claim 9, wherein a frequency range of an operating frequency band covered by the radiator is 650-1000 MHZ.

19. The terminal device according to claim 9, wherein the antenna structure further comprises:

a feeding source and a matching circuit, wherein the feeding point is electrically connected to the feeding source through the matching circuit.

* * * * *